(12) United States Patent
Kearsey et al.

(10) Patent No.: US 9,934,330 B2
(45) Date of Patent: Apr. 3, 2018

(54) QUERY GENERATION

(71) Applicant: Oracle International Corporation, Redwood Shores, CA (US)

(72) Inventors: Natascha Kearsey, Bristol (GB); Christian Evans, Bristol (GB); Martin Hogg, Bristol (GB); Paolo Fragapane, Bristol (GB); Steve Corbett, Bristol (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 213 days.

(21) Appl. No.: 13/873,231

(22) Filed: Apr. 30, 2013

(65) Prior Publication Data
US 2013/0246464 A1 Sep. 19, 2013

Related U.S. Application Data

(63) Continuation of application No. 11/602,537, filed on Nov. 20, 2006, now Pat. No. 8,447,771.

(51) Int. Cl.
*G06F 17/30* (2006.01)

(52) U.S. Cl.
CPC .. *G06F 17/30967* (2013.01); *G06F 17/30401* (2013.01)

(58) Field of Classification Search
CPC .............. G06F 17/30967; G06F 17/30401
See application file for complete search history.

(56) References Cited

U.S. PATENT DOCUMENTS

| | | | |
|---|---|---|---|
| 5,870,737 A | 2/1999 | Dockter et al. | |
| 6,285,998 B1 * | 9/2001 | Black | G06F 17/30392 |
| 6,523,172 B1 * | 2/2003 | Martinez-Guerra et al. | . 717/143 |
| 6,665,666 B1 | 12/2003 | Brown et al. | |
| 8,447,771 B2 | 5/2013 | Kearsey et al. | |
| 2003/0200194 A1 * | 10/2003 | Arnold et al. | 707/1 |
| 2004/0002941 A1 | 1/2004 | Thorne et al. | |
| 2004/0073539 A1 | 4/2004 | Dettinger et al. | |
| 2004/0158557 A1 | 8/2004 | Welcker et al. | |
| 2005/0015368 A1 * | 1/2005 | Payton et al. | 707/4 |
| 2005/0138073 A1 | 6/2005 | Zhou et al. | |

(Continued)

OTHER PUBLICATIONS

U.S. Appl. No. 11/602,537, Final Office Action dated May 26, 2010, 19 pages.

(Continued)

*Primary Examiner* — Alicia M Willoughby
(74) *Attorney, Agent, or Firm* — Kilpatrick Townsend & Stockton LLP

(57) ABSTRACT

A query generator is operable to generate a query for retrieving data that satisfy a conditional expression from a database, and/or perform an arbitrary calculation on at least part of the retrieved data. The query generator can receive an input query and analyze the query to ascertain whether it contains a replaceable token. If the query contains a replaceable token, the query generator can replace that token with user input specifying a parameter of the conditional expression and/or the arbitrary calculation, thereby generating an output query for retrieving the data that satisfy the conditional expression and/or performing the arbitrary calculation on the retrieved data.

20 Claims, 5 Drawing Sheets

(56) References Cited

U.S. PATENT DOCUMENTS

| | | | |
|---|---|---|---|
| 2005/0234878 A1* | 10/2005 | Dettinger et al. | 707/3 |
| 2006/0173845 A1* | 8/2006 | Handy-Bosma et al. | 707/9 |
| 2007/0276825 A1* | 11/2007 | Dettinger et al. | 707/6 |
| 2008/0120326 A1 | 5/2008 | Kearsey et al. | |
| 2008/0215539 A1* | 9/2008 | Barsness et al. | 707/2 |

OTHER PUBLICATIONS

U.S. Appl. No. 11/602,537, Final Office Action dated Aug. 15, 2011, 20 pages.
U.S. Appl. No. 11/602,537, Final Office Action dated Apr. 13, 2009, 25 pages.
U.S. Appl. No. 11/602,537, Non-Final Office Action dated Aug. 6, 2012, 12 pages.
U.S. Appl. No. 11/602,537, Non-Final Office Action dated Sep. 29, 20088, 15 pages.
U.S. Appl. No. 11/602,537, Non-Final Office Action dated Mar. 1, 2011, 18 pages.
U.S. Appl. No. 11/602,537, Non-Final Office Action dated Nov. 30, 2009, 29 pages.
U.S. Appl. No. 11/602,537, Non-Final Office Action dated Feb. 28, 2012, 6 pages.
U.S. Appl. No. 11/602,537, Notice of Allowance dated Jan. 18, 2013, 16 pages.
Lans, Introduction to SQL: Mastering the Relational Database Language, Pearson Education Limited, 2000, pp. 32-34, 82-83, and 129.

* cited by examiner

| MONTH | SALES_AMOUNT | PROJECTED_SALES |
|---|---|---|
| JANUARY | 10000 | 12000 |
| FEBRUARY | 11000 | 12000 |
| MARCH | 9000 | 15000 |
| APRIL | 18000 | 14000 |
| MAY | 15000 | 16000 |
| JUNE | 17000 | 13000 |
| JULY | 12000 | 13000 |
| AUGUST | 20000 | 18000 |
| SEPTEMBER | 15000 | 20000 |
| OCTOBER | 16000 | 16000 |
| NOVEMBER | 18000 | 17000 |
| DECEMBER | 12000 | 14000 |

QUERY GENERATION

This application claims priority to U.S. patent application Ser. No. 11/602,537, filed on Nov. 20, 2006, entitled QUERY GENERATION, which is hereby incorporated herein by reference.

BACKGROUND OF THE INVENTION

The present invention relates to a method for generating queries, a query generator, and to an information management system, in particular for use with relational databases.

Query generators, for example Discoverer® from Oracle® International Corporation of Redwood Shores, Calif., are used to construct database queries which are then sent to a database for execution. A user constructs a query by selecting items from a drop down list of items displayed on the screen. The items may represent data which are to be obtained from the database, or alternatively they may represent operations that are to be performed on these data. Once the items have been selected, the query generator then generates a query, usually in Structured Query Language (SQL), for execution by the database.

It is possible for a user to construct a SQL query that evaluates returned data items to see whether they meet a predefined condition. For example, a query may return data from a database table that represent the value of sales that have been made in each month of a year, and the SQL statement may incorporate a conditional expression that filters out all values for which the value of sales is below a certain amount. Other types of SQL statements may cause a calculation to be performed on the data. For example, a percentage value may be calculated for each of the returned sales values as a proportion of the total sales for all the months of the year. This percentage value would typically be presented to the user in the form of an extra column displayed in the table adjacent the returned value of the sales for each month.

However, this represents a rather inflexible approach since the query operates in exactly the same way each time it is executed, and it is therefore necessary to generate totally separate queries for all types of filtering and calculation operation which may be required. Obviously, this increases significantly the effort required to build and maintain the queries, and requires increased storage capacity for storing the queries.

A query may also be used as a data retrieval engine for a report generator. The report generator is typically configured to format and output the subset of data retrieved by the query. This output may be displayed on screen or a hard copy may be printed. A user or administrator will generate a new query when they initially configure a report.

In large data warehousing applications, database tables are often used which number many millions of records. In these situations hundreds of thousands of records can be returned if a user does not significantly filter the data returned from an executed query. Such results can be difficult to manage and severely occupy system resources.

Also in these applications, which are often utilized in large business or public organizations, a number of hard copy reports are often required at regular time intervals to provide a continued flow of information or keep abreast of any changes within the database tables. The creation of these reports is often a time consuming process of considerable complexity and thus the reports are often generated by computer professionals at considerable expense.

BRIEF SUMMARY OF THE INVENTION

In accordance with a first aspect of the invention, there is provided a query generator for generating a query for retrieving data that satisfy a conditional expression from a database and/or performing an arbitrary calculation on at least part of the retrieved data, wherein the query generator is adapted to receive an input query; analyze the input query to ascertain whether it contains a replaceable token; and if it does, replace that token with user input specifying a parameter of the conditional expression and/or the arbitrary calculation, thereby generating an output query for retrieving the data that satisfy the conditional expression and/or performing the arbitrary calculation on the retrieved data.

In accordance with a second aspect of the invention, there is provided a method for generating a query for retrieving data that satisfy a conditional expression from a database and/or performing an arbitrary calculation on at least part of the retrieved data, wherein the method comprises receiving an input query; analyzing the input query to ascertain whether it contains a replaceable token; and if it does, replacing that token with user input specifying a parameter of the conditional expression and/or the arbitrary calculation, thereby generating an output query for retrieving the data that satisfy the conditional expression and/or performing the arbitrary calculation on the retrieved data.

Hence, by allowing a replaceable token to be present in an input query, detecting the presence of such a replacement token when the query is invoked and allowing the user to replace that token with a parameter of a conditional expression and/or arbitrary calculation, the disadvantages of the prior art are overcome. In particular, the user can input a different parameter each time the expression is run allowing the generation of a diverse range of reports from a single input query.

Typically, the input and output queries are SQL queries.

Of course, the output query is normally executed on the database, thereby retrieving the data that satisfy the conditional expression and/or performing the arbitrary calculations.

The results of any arbitrary calculation are normally displayed in a column juxtaposed with a table containing the data on which the calculation was performed.

In one embodiment, the user input is validated to ensure that it meets predefined criteria. This prevents the user from entering parameters which are clearly nonsensical and would cause an error on execution.

In some circumstances it may be that the parameter specified by the user input is an expression.

In accordance with a third aspect of the invention, there is provided an information management system comprising a first data store containing database data, and a query generator adapted to retrieve and output a subset of the database data that satisfies at least one conditional expression. The system also comprises a user interface configured to receive input from, and output information to, a user; and a second data store containing one or more persistent parameter definitions, each persistent parameter definition comprising data describing a parameter to be used in the at least one conditional expression. The query generator is further adapted to verify whether the at least one conditional expression references a parameter having a persistent parameter definition, and if it does, obtain via the user interface user input for the parameter based on the persistent parameter definition.

In accordance with a fourth aspect of the invention, there is provided a method for generating a query comprising the steps of defining one or more persistent parameter definitions, each persistent parameter definition comprising data describing a parameter to be used in a conditional expression; selecting a data source; and receiving a query with at least one conditional expression, the at least one conditional expression defining a subset of data from the data source. The method also includes verifying whether the at least one conditional expression references a parameter having a persistent parameter definition; and if it does, obtaining user input for the parameter based on the persistent parameter definition and using said user input in the conditional expression. The method also comprises executing the query and formatting and returning said subset of data.

Referencing a stored persistent parameter definition and obtaining user input based on this parameter definition allows the administrator who created the parameter definition more control over the execution of a query. The definition could for example comprise data describing at least one of the following properties: the parameter name, a default value for the parameter, whether multiple values are allowed, whether the parameter is optional or mandatory, a text prompt used to prompt the user for input, the item or field the parameter is related to. This data is then used, to operate a standard set of validation and verification procedures each time the parameter is used. Hence, there is less risk of data inconsistency or inconsistent operation. As many queries need to be generated in large data warehousing applications, those responsible for the generation of such queries need only reference an existing persistent parameter definition instead of individually defining parameter input procedures. This in turn greatly increases the speed and ease with which queries are created.

In accordance with a fifth aspect of the invention, a computer program comprises computer program code means adapted to perform the method of the second aspect or the fourth aspect of the invention when said program is run on a computer.

In accordance with a sixth aspect of the invention, a computer program product comprises program code means stored on a computer readable medium for performing the method of the second aspect or the fourth aspect of the invention when said program is run on a computer.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figures 1, 2:
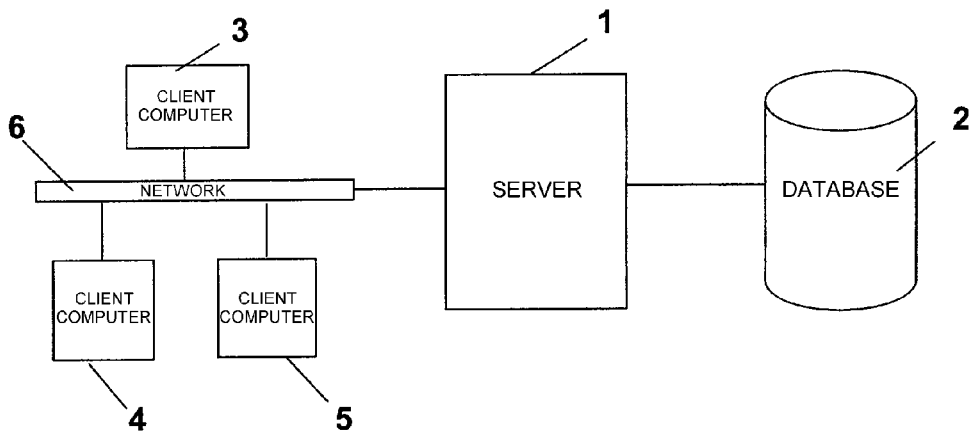
FIG. 1 shows a system on which a first embodiment invention may be implemented.
FIG. 2 shows a database table showing sample data on which the invention may be performed.

FIG. 1 shows a server 1 which is connected to a database 2. The server 1 is operable to receive requests from client computers 3, 4, 5 via a network 6. This network 6 may be a local area network (LAN) or indeed it may be the Internet. Each of the client computers 3, 4, 5 runs query generator software that can construct a query in response to user input and transmit the query over network 6 to the server 1. The server 1 then executes the received query and extracts the necessary data from database 2 and performs any necessary computations on it before returning the results over the network 6 to the respective client computer 3, 4, or 5.

FIG. 2 shows sample data on which the invention may be utilised. In particular, it shows a table known as "Sales" which has three columns known as "MONTH", "SALES_AMOUNT" and "PROJECTED_SALES". These store data items whose values represent the months of the year, the amount of sales made in that month and the expected amount of sales for that month respectively. For example, it can be seen that the amount of sales in May was 15000 but the projected amount was 16000.

If a user required to retrieve all rows from this table where the corresponding value of SALES_AMOUNT was greater than 15000, they would construct a query using the query generator for which the following SQL statement would be generated:

```
SELECT MONTH, SALES_AMOUNT
FROM SALES
WHERE SALES_AMOUNT > 15000
```

The WHERE clause in this SQL statement acts to filter out all data values for which the SALES_AMOUNT value is less than 15000. It does this by evaluating each retrieved value against the conditional expression of: SALES_AMOUNT>15000. This type of expression is represented internally by the query generator in the form of an expression tree. As will be appreciated by those skilled in the art, an expression tree is made up of a plurality of nodes, which may include function nodes, item nodes and value nodes. In the above example, the function node is the greater than operator (>), the item node is the SALES_AMOUNT data item and the value node is 15000.

Another type of node that can make up an expression tree is a parameter node. For example, the value 15000 in the previous SQL statement may be replaced by the parameter PARAM and the parameter PARAM represents a parameter node in the expression tree. Previously, when the query generator has been caused to invoke a particular expression containing a parameter node such as this, a dialogue box was placed on the screen requesting that the user enter a literal value to replace the parameter. In this example, they would replace the parameter with the literal value 15000.

However, with this invention it is possible to replace the parameter node by an item node, and this gives the user the capability of entering an expression rather than a literal value to replace the parameter. Thus, for example the user may replace the parameter with the expression PROJECTED_SALES*1.1 such that the query only retrieves those values for which the sales amount exceeds the projected sales amount by at least 10%.

Two examples will now be described with reference to FIGS. 2 and 3 to illustrate a first embodiment of the invention. In the first example, an SQL query exists as shown below:

```
SELECT MONTH, SALES_AMOUNT FROM SALES
WHERE SALES_AMOUNT > :PARAM
```

This query contains a parameter PARAM. A colon is added before the parameter to represent standard SQL syntax as is used in typical SQL interpretations. In step 10 of FIG. 3, the query is received by the query generator software after it has been invoked by a user, and the query is analyzed in step 11 to see whether it contains a parameter or token which should be replaced. During this analysis step, the expression tree is parsed node by node to detect the presence of each parameter node. If none is found then processing simply proceeds to step 14 which will be described later.

However, for each parameter node that is found (for example, the node PARAM in this case), a message is sent in step 12 to user interface software causing it to request (usually by way of a dialogue box) user input for the detected parameter node. Thus, in this case the user is prompted to enter an expression to replace the parameter node PARAM. Because, in this example, the user requires to see all values of sales which exceed the projected value by at least 10%, he will enter the expression PROJECTED_SALES*1.1. In step 13, this user input is converted into an item node by the software and used to replace the parameter node PARAM.

There may be multiple parameter nodes in an expression tree, in which case user input is gathered for each of them. Once the user input for each parameter node has been collected, each parameter node is replaced by a new item node if the user entered an expression or a new value node if the user entered a literal value.

In step 14, the query is sent over network 6 to the server 1. The server 1 then executes the query in step 15 and retrieves the results from database 2. In step 16 these results are returned to the originating client computer 3, 4 or 5 which then displays the results to the user in step 17.

In this case, the sales for April, June and August exceed their projected sales targets by more than 10%, and so the following results table will be shown to the user:

| MONTH | SALES_AMOUNT |
|---|---|
| APRIL | 18000 |
| JUNE | 17000 |
| AUGUST | 20000 |

In a second example, a filtering operation is not performed, but instead the software performs a calculation on the retrieved data. In this case, the user requires to see each of the sales amounts by month, along with the value of each sales amount converted into another currency. The starting SQL statement for this is:

```
SELECT MONTH, SALES_AMOUNT, SALES_AMOUNT *
:EXCHANGE_RATE_PARAM FROM SALES
```

In this case, the query generator software receives the input query when the query is invoked by a user in step 10.

In step 11 the query is analyzed to determine whether it has a parameter or token to be replaced. In this case since it does processing proceeds to step 12 where the user is prompted to enter an item to replace the parameter. In this case, since they wish to see the US dollar equivalent of the SALES_AMOUNT value they will enter the following "SALES_AMOUNT*1.8" (assuming that £1 is equal to US $1.8).

In step 13, the parameter EXCHANGE_RATEPARAM is replaced by "SALES_AMOUNT*1.8" to complete the query which is then sent to the server in step 14. Processing then proceeds as with the first example. However, the server returns to the client not only the values for the MONTH and SALES_AMOUNT columns but also a separate column representing SALES_AMOUNT×1.8. The results are displayed to the user as shown in the following table:

| MONTH | SALES_AMOUNT | SALES_AMOUNT * 1.8 |
|---|---|---|
| JANUARY | 10000 | 18000 |
| FEBRUARY | 11000 | 19800 |
| MARCH | 9000 | 16200 |
| APRIL | 18000 | 32400 |
| MAY | 15000 | 27000 |
| JUNE | 17000 | 30600 |
| JULY | 12000 | 21600 |
| AUGUST | 20000 | 36000 |
| SEPTEMBER | 15000 | 27000 |
| OCTOBER | 16000 | 28800 |
| NOVEMBER | 18000 | 32400 |
| DECEMBER | 12000 | 21600 |

Thus, the invention provides very flexible reporting facilities. For example, in the first example, the base report can be used to show months where the SALES_AMOUNT values were higher or lower than expected by running two consecutive passes with different expressions substituted for the parameter EXCHANGE_RATE_PARAM. Similarly, the second report can easily adopt to differing exchange rates, and may be used to produce tables with the SALES_AMOUNT values converted into many different currencies.

The types of expression or calculation entered may be simple or arbitrarily complex. All that is required in one aspect is that a valid expression or calculation is entered that can be resolved by the database. To this end, some validation of the input is performed in step 12 shown in FIG. 3. For example, the validation process may check that the expression entered is valid in the sense that it refers to entities actually stored on the database (for example, the SALES_AMOUNT column referred to before) and/or that the expression does not contain a comparison or assignment of inconsistent types of data (for example, character data with numeric data).

Figure 4:
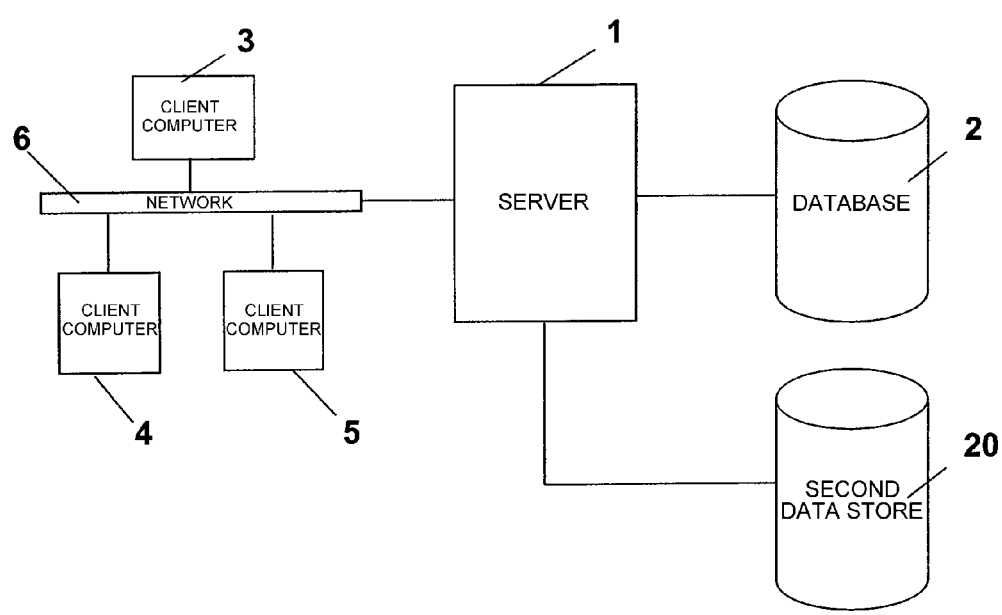
FIG. 4 shows a system on which a second embodiment of the invention is implemented.
Figure 6:
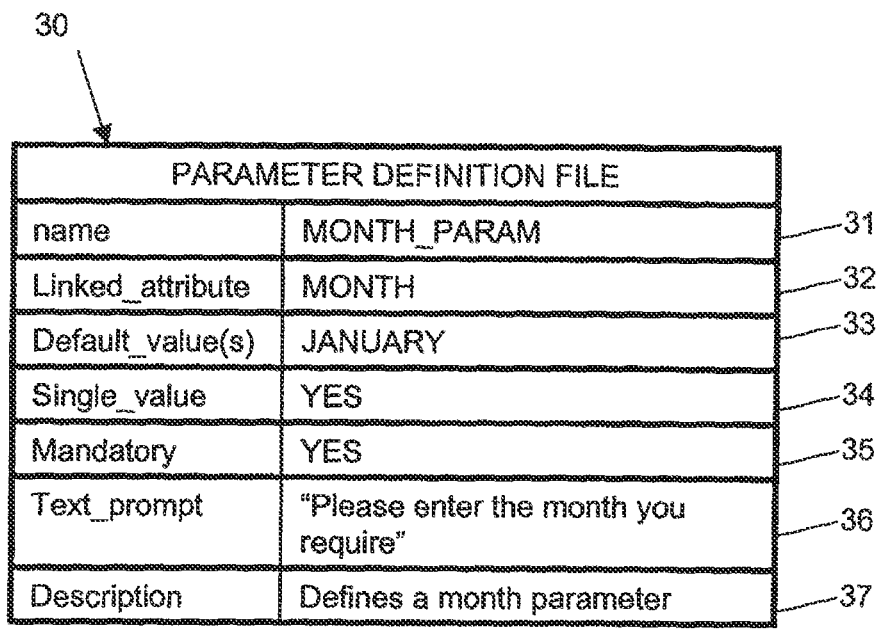
FIG. 6 shows a parameter definition according to the second embodiment of the invention.

A second embodiment will now be described with reference to FIGS. 4 and 6. FIG. 4 shows similar apparatus to FIG. 1, but in this embodiment each parameter previously presented as PARAM has associated metadata that is defined independently of the query generator. This metadata is known as a parameter definition. It is typically generated by an administrator of the database system and is stored in a second data store 20 independently of the database system. It is also possible that the parameter definition is stored as part of the database 2, whilst still being accessible by client computers 3, 4, 5 or the server 1. The parameter definition is stored in a data file 30, such as that demonstrated in FIG. 6, in order that the metadata stored within persists outside of an individual report or query. The metadata can comprise any information describing a parameter including: the parameter name 31, a default value or list of default values 33 for the parameter, whether multiple values are allowed 34, whether the parameter is optional or mandatory 35, a text prompt used to prompt the user for input 36, the item or field the parameter is related to 32, and an optional description field 37. A list of defaults values 33 would be used if multiple values were allowed for the parameter.

In the simplest of cases, each parameter definition stores the name 31 of a parameter and a variable signifying whether the parameter is optional or mandatory 35. If the parameter is mandatory users initiating a query must enter parameter values at run time to restrict the results of the query as shown in step 12 of FIG. 3. If a parameter is said to be optional then users are free to enter values if they so wish. If a user decides not to enter a value then the query generator software is adapted to nullify the conditional expression containing the referenced parameter from the query before execution. Hence, if a user chooses not to enter a value then any conditions or calculations that reference the parameter are ignored.

In one embodiment, when a user does not enter a value for an optional parameter, the conditions or sub-conditions referencing the optional parameter are effectively cancelled out by converting them to statements that always evaluate to true. This effectively nullifies the condition or sub-condition. This is to accommodate situations involving a condition such as 'WHERE itemA>900 OR itemB=:param 1'. If ':param1' is an optional parameter and no value is entered by the user, the query generator should still evaluate the first sub-condition. Thus the second sub-condition could be replaced with an expression such as '1=1' that will always evaluate to true.

If a parameter is to be used in a calculation, it is often preferable to specify that the parameter is a mandatory parameter, as this prevents complications with absent calculation values. Thus, when an administrator is initially creating a query or report and selects a parameter to be used in a calculation, a validation procedure is initiated that interrogates the associated parameter definition file, checks to see whether the parameter is mandatory, and if it is not, alerts the administrator and prevents the use of the parameter. This then prevents situations arising that involve calculations with un-entered optional parameters.

This parameter definition can further be extended to include linked attribute information 32. This is a reference to the field or data item upon which the parameter is based. The query generator software, on interpreting this reference, can generate a list of expected values that then may be presented to the user. This list of values can be presented in the form of a drop down box or similar interface object, and can further be stored within the parameter definition if it is required. In one embodiment the list of expected values are dynamically retrieved at runtime based on a SQL select statement on the Linked_attribute. This saves space and, as the list is created dynamically, prevents stale values being stored and used. The values can also be used in subsequent validation and verification of entered data. In a similar way, the parameter definition also stores a default value 33 to use for the parameter. This can be a reference to an item within the list of values or can be a value stored explicitly within the definition.

As these parameter definitions are saved as individual entities outside of the query generator, an administrator generating a query or request will have access to a pool of common parameters that they can reference in any query or report they decide to create. This then allows for rapid turnout of reports and queries and provides the administrator with a standardized set of parameters, reducing inconsistency.

By using a mandatory variable the administrator can force users to select a subset of data. This becomes important when dealing with large database tables which may contain millions of rows. If a user was performing a query on such a large database table and the result of a query returned many millions of rows then this operation would consume a large number of system resources and occupy the server 1 for a large amount of time. By setting mandatory parameters the user is forced to restrict the data to be returned to a subset of a database table and can thus be provided with a much more manageable set of results.

Figure 5:
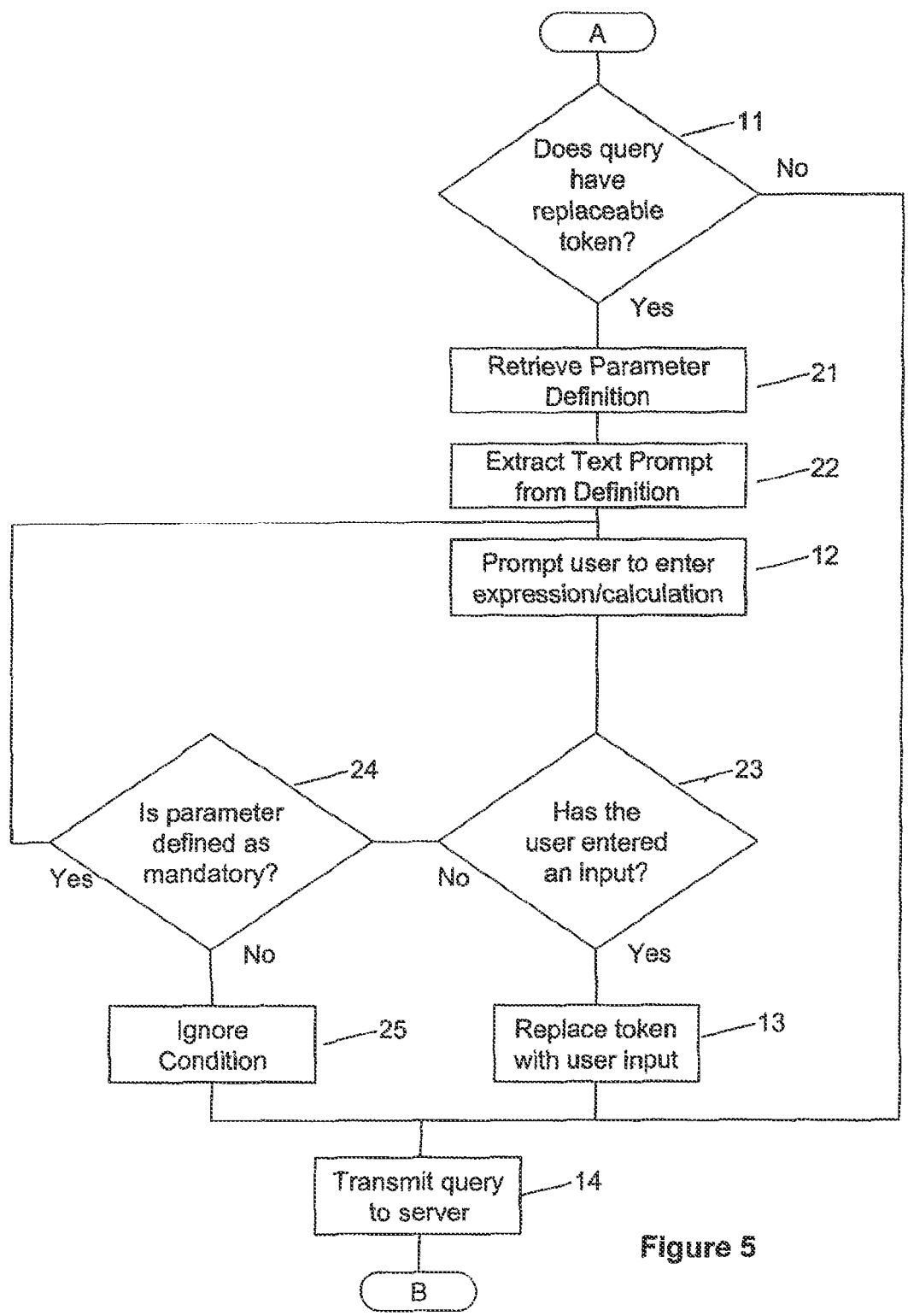
FIG. 5 shows a flowchart describing a method performed by a second embodiment of the invention.

An example will now be described with reference to FIG. 5 to illustrate this embodiment of the current invention. Returning to the example database table shown in FIG. 2 an administrator would generate a SQL query as shown below:

```
SELECT MONTH, SALES_AMOUNT FROM SALES
WHERE MONTH>MONTH_PARAM:p1 AND
MONTH<MONTH_PARAM:p2
```

This query thus has two references to the MONTH_PARAM parameter definition. Each of the two uses of the parameter requires a different alias; referred to in this example as 'p1' and 'p2' respectively. This ensures that, for each of the two usages of the same underlying parameter definition, a user is prompted separately for each alias and that two values or sets of values are collected, one linked to 'p1' and one linked to 'p2'. The associated parameter definition is illustrated in FIG. 6.

In other examples it is perfectly valid to use the same parameter values more than once in a condition or calculation. For example, in an extended SQL query an administrator may wish to force a user provide one parameter input to select two fields, say the month of product sale and the month of product return, in which case an expression such as 'WHERE MONTH_OF_SALE=MONTH_PARAM:p1 AND MONTH_OF_RETURN=MONTH_PARAM:p1' would be used. In this case one parameter p1, referencing a MONTH parameter definition, is provided to filter the two fields.

Figure 3:
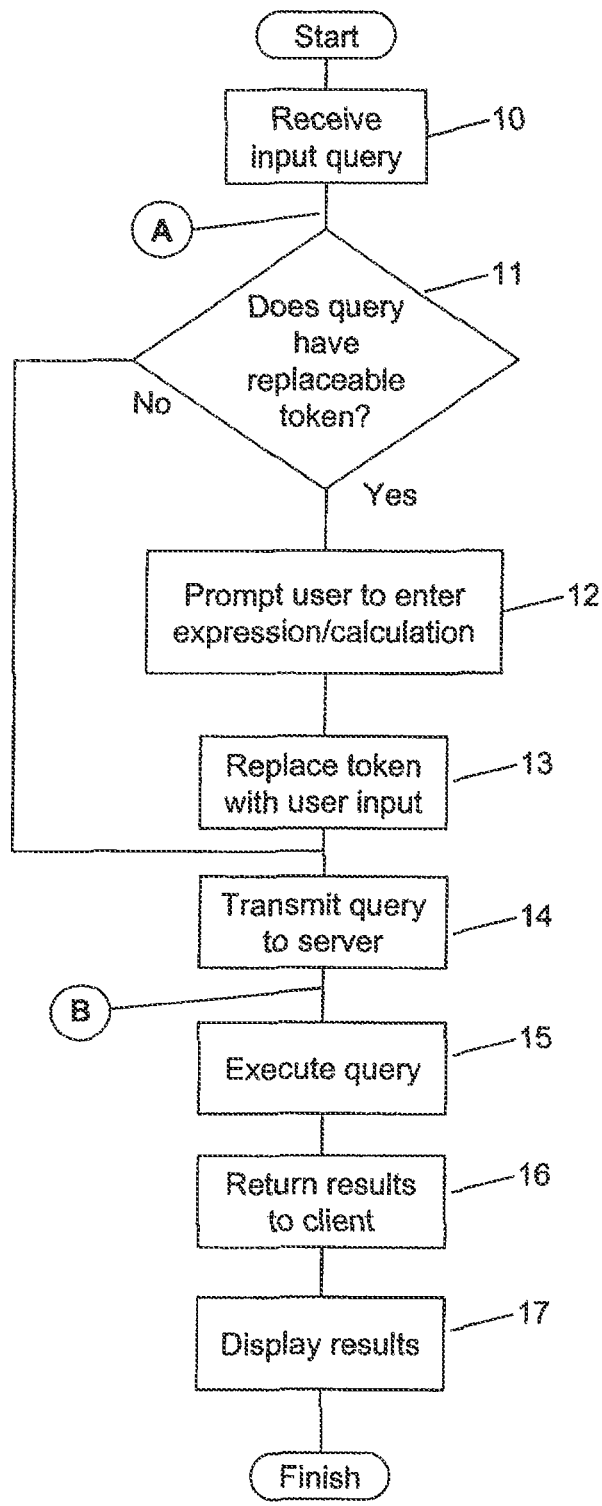
FIG. 3 shows a flowchart describing the method performed by the invention in a schematic form.

Returning to the given example, in a similar manner to FIG. 3 the query is received by the query generator software after it has been invoked by a user and the query is analysed in step 11 to see whether it contains a parameter or token which should be replaced. If such a token or parameter is detected, then the query generator software accesses the parameter definition and retrieves 21 the relevant information from this definition. In this example MONTH_PARAM will be detected on parsing the second line of the query and the query generator software will consult a record detailing parameters that have an associated definition. This consultation could also be performed by searching the second data store 20 and examining the headers of any parameter definitions stored within. As in this case a parameter definition does exist so that the query generator software is provided with a link or handle to the parameter definition file 30 and the information stored within.

Looking back to FIG. 3, the next step requires an input from a user. The query generator software is adapted to send a message to the user interface software causing it to request user input for the detected parameter node. When the parameter has an associated definition the query generator software extracts 22 the text prompt 36 from the definition and includes it in the message. The user interface software then uses this text prompt 36 to prompt the user for input 12.

Linked attribute 32 information can also be retrieved and this is used to generate a list of values which are to be displayed to the user; for example, in this case as the linked attribute 32 is MONTH then the months of the year from January through to December will be displayed to the user, normally by way of a dialogue box or mini form. In some embodiments the list of values can be retrieved from a separate list or query that uses the linked attribute 32 to identify the values, as discussed previously. The user can then select one of these values to enter as the current instance of the parameter. Alternatively, the list of values can be used to validate and/or verify the user input; for example, the user input in this case would be analysed to see whether it matched one of the twelve months of the year and if it did not then the user will be prompted again to re-enter the parameter information. This attribute information can also be left blank in which case no list of values or entry validation will be available. A default value 33 ("JANUARY") can also be extracted from the parameter definition and presented in a dialogue box, or selected in a drop down list, to demonstrate a typical parameter entry.

The user then inputs or selects his parameter. As in the previous case this can also be an expression, which does not alter the structure of the parameter definition. If the user interface software detects that no value has been entered 23 then it can interrogate the parameter definition 24 to see whether the parameter is optional or mandatory. If the parameter is optional then a message is relayed to the query generator software to nullify the conditional expression (or part of a conditional expression) containing the parameter from the query 25, as also discussed previously. If a parameter is mandatory then the user is again prompted to enter an expression or calculation. Once the user inputs a correctly validated value or expression the parameter token in the query is replaced with the input 13 as discussed previously.

For this parameter definition, multiple values are not allowed and so the user interface software will only present the user with one opportunity to select or enter a value. After the user has selected or entered their value for the parameter and it is used to replace the parameter node MONTH_PARAM as described earlier.

In this example, as there are two parameter tokens with an associated parameter definition the above sequence will be performed again for the second instance of MONTH_PARAM. Whilst the same parameter definition will be used a different parameter value can be entered. This demonstrates how one parameter definition can be reused to obtain different input. In the prior art, the procedure for each parameter input would have to be defined individually. In use, different parameter definitions can also be referenced within one query. Finally, the query is transmitted to the server for execution as before, and the server 1 returns the subset of data to be formatted and displayed to the user.

The use of a parameter definition becomes more important when we deal with large data warehouses on a much larger scale than the simple example displayed in this specification. This allows data administrators to have more control over the results of queries and enables reports to be created without worrying about administrative issues.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROMs, as well as transmission-type media, such as digital and analogue communications links.

Even though the first and second embodiments have been described as two parts of a single system, each embodiment can also be implemented independently of each other. For example a system's administrator could implement the replacement of a parameter node, as described with reference to FIG. 3, without the use of a persistent parameter definition. Likewise parameter definitions can be used in a manner described with reference to the second embodiment with a wide range of parameterisation techniques independent of the specific solution set out in the first embodiment.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for generating queries, the method comprising:
   receiving, at a computer system, a query;
   identifying, by the computer system, a first replaceable token, a second replaceable token, and a third replaceable token in the query, wherein:
     the first replaceable token comprises a first alias that designates a first instance of a first parameter;
     the second replaceable token comprises a second alias that designates a second instance of the first parameter;
     the third replaceable token comprises the first alias that designates a reuse of the first instance of a first parameter in the query;
   retrieving, by the computer system, a parameter definition for the parameter from a plurality of parameter definitions, wherein the parameter definition comprises a text prompt that requests an input providing a value for the parameter;
   generating, by the computer system, a first graphical user interface (GUI) comprising the text prompt that requests an input providing a value for the parameter;
   receiving, by the computer system, and through the first GUI, input representing a first value for the parameter;
   replacing, by the computer system, the first replaceable token and the third replaceable token in the query with the first value for the parameter;
   generating, by the computer system, a second GUI comprising the text prompt that requests an input providing a value for the parameter;
   receiving, by the computer system, and through the first GUI, input representing a second value of the parameter;
   replacing, by the computer system, the second replaceable token in the query with the second value for the parameter; and
   submitting, by the computer system, the query for evaluation.

2. The method of claim 1, further comprising:
   determining that the first value for the parameter comprises a conditional expression;

determining that the second value for the parameter comprises a numerical value;
evaluating the conditional expression before submitting the query for evaluation;
receiving query results in response to submitting the query for evaluation; and
multiplying the query results by the numerical value before displaying the results.

3. The method of claim 2, further comprising displaying the results of multiplying the query results by the numerical value in a column juxtaposed with a column containing the data on which the multiplication was performed.

4. The method of claim 1, further comprising:
determining whether receiving a value for the parameter is optional and not mandatory based on the parameter definition; and
determining that the first value for the parameter is a null value, wherein:
replacing the first replaceable token in the query with the first value for the parameter comprises, based on determining whether receiving a value for the parameter is optional, nullifying a conditional expression in the query that includes the first replaceable token.

5. The method of claim 4, wherein nullifying the conditional expression comprises replacing the conditional expression with an expression that always evaluates to TRUE such that any other conditional expressions in the query are still be evaluated.

6. The method of claim 1, wherein the query comprises a structured query language (SQL) query.

7. The method of claim 1, further comprising validating the input to ensure that it meets predefined criteria from the parameter definition.

8. The method of claim 1, wherein the parameter definition further comprises:
a parameter name;
a default value for the parameter;
a field designating whether multiple values are allowed;
a field designating whether the parameter is optional or mandatory; and
an item or field that is related to the parameter.

9. A system comprising:
one or more processors;
one or more memory devices comprising instructions that, when executed by the one or more processors, cause the one or more processors to perform operations comprising:
receiving a query;
identifying a first replaceable token, a second replaceable token, and a third replaceable token in the query, wherein:
the first replaceable token comprises a first alias that designates a first instance of a first parameter;
the second replaceable token comprises a second alias that designates a second instance of the first parameter;
the third replaceable token comprises the first alias that designates a reuse of the first instance of a first parameter in the query;
retrieving a parameter definition for the parameter from a plurality of parameter definitions, wherein the parameter definition comprises a text prompt that requests an input providing a value for the parameter;
generating a first graphical user interface (GUI) comprising the text prompt that requests an input providing a value for the parameter;
receiving and through the first GUI, input representing a first value for the parameter;
replacing the first replaceable token and the third replaceable token in the query with the first value for the parameter;
generating a second GUI comprising the text prompt that requests an input providing a value for the parameter;
receiving and through the first GUI, input representing a second value of the parameter;
replacing the second replaceable token in the query with the second value for the parameter; and
submitting the query for evaluation.

10. The system of claim 9, wherein the one or more memories further comprise additional instructions that, when executed by the one or more processors, cause the one or more processors to perform operations comprising:
determining that the first value for the parameter comprises a conditional expression;
determining that the second value for the parameter comprises a numerical value;
evaluating the conditional expression before submitting the query for evaluation;
receiving query results in response to submitting the query for evaluation; and
multiplying the query results by the numerical value before displaying the results.

11. The system of claim 10, wherein the one or more memories further comprise additional instructions that, when executed by the one or more processors, cause the one or more processors to perform operations comprising:
displaying the results of multiplying the query results by the numerical value in a column juxtaposed with a column containing the data on which the multiplication was performed.

12. The system of claim 9, wherein the one or more memories further comprise additional instructions that, when executed by the one or more processors, cause the one or more processors to perform operations comprising:
determining whether receiving a value for the parameter is optional and not mandatory based on the parameter definition; and
determining that the first value for the parameter is a null value, wherein:
replacing the first replaceable token in the query with the first value for the parameter comprises, based on determining whether receiving a value for the parameter is optional, nullifying a conditional expression in the query that includes the first replaceable token.

13. The system of claim 12, wherein nullifying the conditional expression comprises replacing the conditional expression with an expression that always evaluates to TRUE such that any other conditional expressions in the query are still be evaluated.

14. The system of claim 9, wherein the query comprises a structured query language (SQL) query.

15. The system of claim 9, wherein the one or more memories further comprise additional instructions that, when executed by the one or more processors, cause the one or more processors to perform operations comprising:
validating the input to ensure that it meets predefined criteria from the parameter definition.

16. The system of claim 9, wherein the parameter definition further comprises:
- a parameter name;
- a default value for the parameter;
- a field designating whether multiple values are allowed;
- a field designating whether the parameter is optional or mandatory; and
- an item or field that is related to the parameter.

17. A non-transitory, computer-readable memory device comprising instructions that, when executed by one or more processors, cause the one or more processors to perform operations comprising:
- receiving a query;
- identifying a first replaceable token, a second replaceable token, and a third replaceable token in the query, wherein:
  - the first replaceable token comprises a first alias that designates a first instance of a first parameter;
  - the second replaceable token comprises a second alias that designates a second instance of the first parameter;
  - the third replaceable token comprises the first alias that designates a reuse of the first instance of a first parameter in the query;
- retrieving a parameter definition for the parameter from a plurality of parameter definitions, wherein the parameter definition comprises a text prompt that requests an input providing a value for the parameter;
- generating a first graphical user interface (GUI) comprising the text prompt that requests an input providing a value for the parameter;
- receiving and through the first GUI, input representing a first value for the parameter;
- replacing the first replaceable token and the third replaceable token in the query with the first value for the parameter;
- generating a second GUI comprising the text prompt that requests an input providing a value for the parameter;
- receiving and through the first GUI, input representing a second value of the parameter;
- replacing the second replaceable token in the query with the second value for the parameter; and
- submitting the query for evaluation.

18. The non-transitory, computer-readable memory device of claim 17, further comprising additional instructions that, when executed by the one or more processors, cause the one or more processors to perform operations comprising:
- determining that the first value for the parameter comprises a conditional expression;
- determining that the second value for the parameter comprises a numerical value;
- evaluating the conditional expression before submitting the query for evaluation;
- receiving query results in response to submitting the query for evaluation; and
- multiplying the query results by the numerical value before displaying the results.

19. The non-transitory, computer-readable memory device of claim 17, further comprising additional instructions that, when executed by the one or more processors, cause the one or more processors to perform operations comprising:
- determining whether receiving a value for the parameter is optional and not mandatory based on the parameter definition; and
- determining that the first value for the parameter is a null value, wherein:
  - replacing the first replaceable token in the query with the first value for the parameter comprises, based on determining whether receiving a value for the parameter is optional, nullifying a conditional expression in the query that includes the first replaceable token.

20. The non-transitory, computer-readable memory device of claim 17, wherein the parameter definition further comprises:
- a parameter name;
- a default value for the parameter;
- a field designating whether multiple values are allowed;
- a field designating whether the parameter is optional or mandatory; and
- an item or field that is related to the parameter.

* * * * *

UNITED STATES PATENT AND TRADEMARK OFFICE
CERTIFICATE OF CORRECTION

PATENT NO. : 9,934,330 B2
APPLICATION NO. : 13/873231
DATED : April 3, 2018
INVENTOR(S) : Kearsey et al.

It is certified that error appears in the above-identified patent and that said Letters Patent is hereby corrected as shown below:

In Column 6, Line 8, delete "RATEPARAM" and insert -- RATE_PARAM --, therefor.

In Column 6, Line 62, delete "3,4,5" and insert -- 3, 4, 5 --, therefor.

In Column 7, Line 28, delete "':param1'" and insert -- ':param 1' --, therefor.

Signed and Sealed this
Fourth Day of September, 2018

Andrei Iancu
*Director of the United States Patent and Trademark Office*